United States Patent [19]

Winski

[11] Patent Number: 4,547,996
[45] Date of Patent: Oct. 22, 1985

[54] JIG GRINDER WITH AUTOMATIC C-AXIS FEEDRATE CONTROL

[75] Inventor: Dennis A. Winski, Fairfield, Conn.

[73] Assignee: Moore Special Tool Co., Inc., Bridgeport, Conn.

[21] Appl. No.: 604,064

[22] Filed: Apr. 26, 1984

[51] Int. Cl.[4] .............................................. B24B 51/00
[52] U.S. Cl. .................................. 51/165.71; 51/33 R; 125/11 AT; 318/571; 364/474
[58] Field of Search ........................ 409/80, 183, 33 R; 51/165.71, 165 TP, 93, 97 NC, 101 R, 44; 364/474, 475; 318/571, 572, 574; 51/237, 236, 33 R; 125/11 A, 11 AT

[56] References Cited

U.S. PATENT DOCUMENTS

| | | | |
|---|---|---|---|
| 3,123,657 | 3/1962 | Clark, Jr. et al. | 364/474 |
| 3,276,327 | 10/1966 | Arrowsmith et al. | 409/80 |
| 3,840,791 | 10/1974 | Mack | 318/571 |
| 3,942,287 | 3/1976 | Tokunaga et al. | 51/165 TP |
| 3,948,144 | 4/1976 | Nagano | 409/167 |
| 4,228,617 | 10/1980 | Bando | 51/165 TP |

Primary Examiner—Frank T. Yost
Assistant Examiner—Hien H. Phan
Attorney, Agent, or Firm—Kramer and Brufsky

[57] ABSTRACT

A jig grinder is provided with a controller for computing, as a function of an established radius and a preset feedrate, a rotational speed for rotating the machine spindle to provide a uniform surface speed at the cutting edge of the grinding tool as the tool alternates between linear grinding with an X and/or Y axis and arc grinding along the C-axis of the spindle. A method is provided for grinding straight surfaces and adjoining arcs at a constant feedrate without interruption.

6 Claims, 5 Drawing Figures

JIG GRINDER WITH AUTOMATIC C-AXIS FEEDRATE CONTROL

BACKGROUND OF THE INVENTION

The present invention relates to machine tools, and more particularly to a jig grinder having automatic C-axis feedrate control to provide a constant feedrate for straight and arc grinding.

Jig grinders are used by machinists to accurately grind precision holes, radii, blends, and surfaces in metal or other materials. These machine tools are used in the manufacture of a wide variety of high precision products. For example, jig grinders are used by the automotive and aerospace industries for producing engine parts, gears, and the like. Although extreme precision is the primary goal of such applications, productivity is a main concern, particularly in keeping the cost of individual machine parts as reasonable as possible. Accordingly, recent advances in jig grinder design have concentrated on automating the grinding process in an effort to increase machine throughput while maintaining accuracy.

Various grinding techniques which can be accomplished with jig grinders are well known. One such technique is the use of "chop grinding". The chop grinding principle utilizes a rapid reciprocation of the grinding wheel in a direction along the wheel axis. It has been found that this technique grinds cool, providing more consistent surface finishes, geometry and size than other, more conventional grinding techniques.

Chop grinding can be used to machine holes and edges as well as radii. There are several different motions which occur simultaneously during a chop grinding process. One motion is that of the grinding wheel which rotates, typically at a high rate of speed. The grinding wheel, which is coupled to the spindle of the jig grinder, can be offset from the center axis of the spindle (along the machine's "U-axis") so that it will sweep an arc when the spindle is rotated. This motion is useful when grinding arc segments (i.e. curved surfaces) in a workpiece. Rotation of the spindle occurs along the "C-axis" of the jig grinder. As noted above, the grinding wheel will also be reciprocated up and down. Reciprocation of the grinding wheel occurs along the "Z'-axis" of the jig grinder. Further, the workpiece being machined is usually mounted to a worktable, which can be moved in straight paths described by the "X" and/or "Y" axes of the jig grinder.

In the past, jig grinders have been largely manually operated. In performing a chop grinding task, a machine operator would manually index the grinding wheel against the surface to be ground, and commence grinding with a rotating and reciprocating grinding wheel. As material was ground away from the surface of the workpiece, the machine operator would manually feed the grinding wheel toward the workpiece ("outfeed") until the required amount of material was ground off. Upon each outfeed operation, the grinding wheel would create a shower of sparks as it proceeded to strip material from the grinding surface. A machine operator would then wait until the sparks stopped, indicating that the grinding wheel had removed all of the stock up to the outfed position (or the grinding wheel had worn to a point where an outfeed adjustment was necessary). The operator would then manually repeat the cycle until the finished dimensions were reached.

Wipe grinding, which is a technique wherein the grinding wheel is not reciprocated, has also been done manually in the past. An operator would bring the grinding wheel to the surface to be ground, and manually index the grinding wheel toward the workpiece until the required amount of stock material had been removed. When wipe grinding, an operator would slowly and repetitively feed the grinding wheel toward the surface being ground.

Grinding arc segments in a workpiece has generally been somewhat of a trial and error process. One way machine operators grind arc segments is to overcut the desired arc by cutting a longer arc than needed, and then strip away the straight surfaces adjoining the arc along the X and Y axes until the required dimensions are achieved. Another way arcs are ground is by a process known as "contour grinding", in which the X, Y, and/or C axes are indexed simultaneously during grinding. This technique can lead to imprecise results due to the complex geometric relationships which must be controlled when indexing a plurality of axes concurrently. A third technique which has been used for arc grinding is to grind the required straight surfaces along the X and Y axes and then stop, each time an arc is to be ground, so that manual indexing of the C-axis and grinding of the arc can be achieved.

It would be advantageous to provide a jig grinder which is automated to grind arcs and straight surfaces at a constant feedrate without interruption. By reducing the number of manual operations required of the machine operator, such an automated machine tool would increase machine productivity and improve the accuracy to which parts are machined. The present invention relates to an automated machine tool in which these and other advantages are achieved.

SUMMARY OF THE INVENTION

In accordance with the present invention, a machine tool is provided which comprises a work holding table for movement along a linear X and/or Y axis. Movement of the table occurs at a preset feedrate, designated "Fr(p)", which is set by the machine operator. The machine tool further includes a spindle which is rotatable about its axis, designated the "C-axis". A tool holder is mounted to the spindle and has a receptacle for holding a grinding or cutting tool. Means is provided for offsetting the receptacle from the center axis of the spindle to establish a radius (designated "r") from the spindle axis to the cutting edge of a tool mounted in the receptacle. Means is also provided for computing, as a function of the established radius "r" and said preset feedrate "Fr(p)", a rotational speed for the spindle which will provide a uniform surface speed at the cutting edge of a tool as the tool alternates between linear grinding along the X or Y axis and arc grinding along the C-axis. Finally, means is provided for rotating the spindle along the C-axis to traverse a preset arc at the computed rotational speed.

The rotational speed (designated "Fr(c)") at which the spindle must rotate in order to provide the desired uniform surface speed can be computed in accordance with the formula:

$$Fr(c) = \frac{180 \, Fr(p)}{\pi r}$$

A method for grinding straight surfaces and adjoining arcs at a constant feedrate without interruption is also provided in accordance with the present invention. The method comprises the steps of mounting a grinding wheel to the spindle of a jig grinder and offsetting the grinding wheel from the center axis of the spindle to establish a radius "r" from the spindle axis to the cutting edge of the grinding wheel. A workpiece to be machined is mounted to a worktable, and the work table is moved at a preset feedrate "Fr(p)" along a straight path to effect grinding of a straight surface on the workpiece by the grinding wheel. A rotational speed for rotating the spindle to provide a uniform surface speed at the cutting edge of the grinding wheel, as the grinding wheel traverses the workpiece from a straight surface to an arc being ground, is computed as a function of the established radius "r" and the preset feedrate "Fr(p)". The spindle is then rotated at the computed rotational speed when the arc is being ground.

The method described above can comprise the further steps of stopping the movement of the worktable concurrently with the commencement of rotation of the spindle, and stopping the rotation of the spindle concurrently with the commencement of movement of the worktable.

DETAILED DESCRIPTION OF A PREFERRED EMBODIMENT

The present invention provides an improved, automated jig grinder. A specific feature provided by the jig grinder is the automatic control of pocket grinding to provide a constant feedrate, without interruption, when grinding straight surfaces and adjoining corners. This and other features and advantages of the invention will become apparent from the following detailed description of a preferred embodiment when considered in connection with the accompanying drawings.

Figure 1:
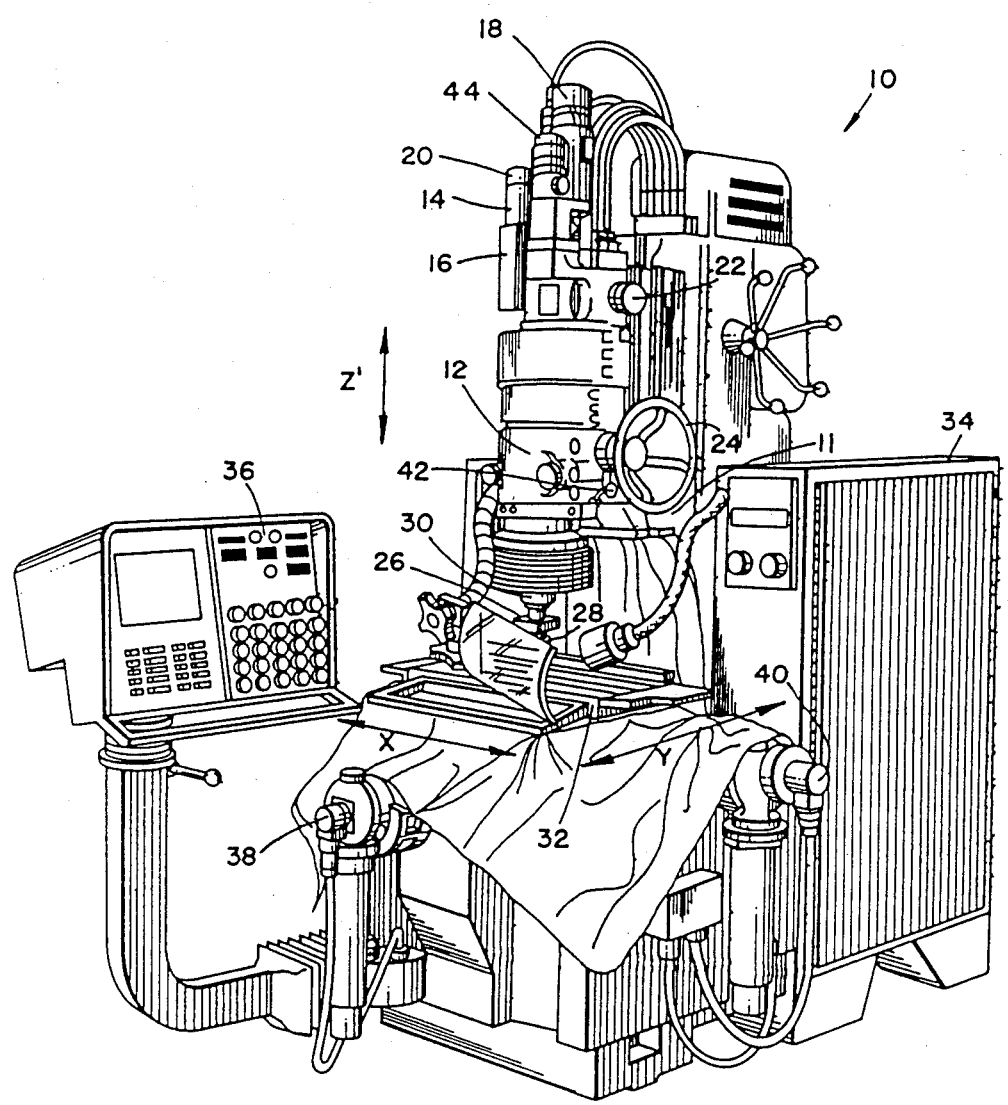
FIG. 1 is a perspective view of a jig grinder which illustrates the placement of various components thereon.

Turning now to FIG. 1, an overall view of a jig grinder 10 is shown. Jig grinders similar to that shown in FIG. 1 are manufactured by Moore Special Tool Co., Inc., the assignee of the present invention. Prior manually operated versions of such jig grinders are well known in the art. Jig grinder 10 includes a fixed housing 11 to which a grinding head 12 is slidingly mounted. Grinding head 12 is adapted to move up and down vertically, along the Z'- axis as designated by the vertical arrow shown in FIG. 1. Grinding head 12 carries a spindle 30 therewithin which is coupled to motor 18 for rotation. An encoder 44 tracks the angular position of spindle 30 as the spindle rotates between 0 and 360 degrees (rollover occurs at 359.99°). Spindle 30 has a tool holder 26 mounted thereto which carries a grinding tool 28 in a receptacle 23 (shown diagrammatically in FIG. 2). Typically, grinding tool 28 is an abrasive wheel.

Included in tool holder 26 is an offset mechanism which can be used to offset tool 28 from the longitudinal axis of spindle 30. The offset mechanism is controlled through a series of gears and links connected to a stepper motor 14. An encoder 20 is coupled to stepper motor 14 and provides an output indicative of the angular position of the stepper motor shaft. It is noted that a servo motor connected in a closed position loop arrangement could be used instead of a stepper motor. A separate encoder 16 mounted to housing 11 provides an output indicative of the vertical position of grinding head 12, and hence spindle 30 and tool 28, with respect to housing 11 along the Z' axis.

Housing 11 also carries a work holding table 32 which is adapted to be moved in the X and Y directions respectively by motors 38 and 40. An operator control panel 36 enables an operator to interface with the automatic machine controls. Cabinet 34 houses a numerical controller and associated computer equipment.

Movement of grinding head 12 with respect to housing 11 can be controlled manually by manipulating hand wheel 24, or automatically via the operator control panel 36. A manually adjustable orifice 22 is provided to enable an operator to control the speed at which grinding head 12 reciprocates in the automatic mode. An additional manually adjustable orifice (not shown) can be provided for fine control of the reciprocation speed. A hand lever 42 is provided to override all other controls and move grinding head 12 up under automatic control.

It is desirable, in grinding pockets, holes, or arc segments, to maintain a uniform surface speed at the cutting edge of the grinding wheel throughout the grinding process. In other words, the feedrate of the grinding tool with respect to the workpiece should be maintained constant as the tool progresses from a starting point to a finish point in the surface being ground. Examples of shapes which require arc segment grinding are shown in FIGS. 3 and 4.

Figure 2:
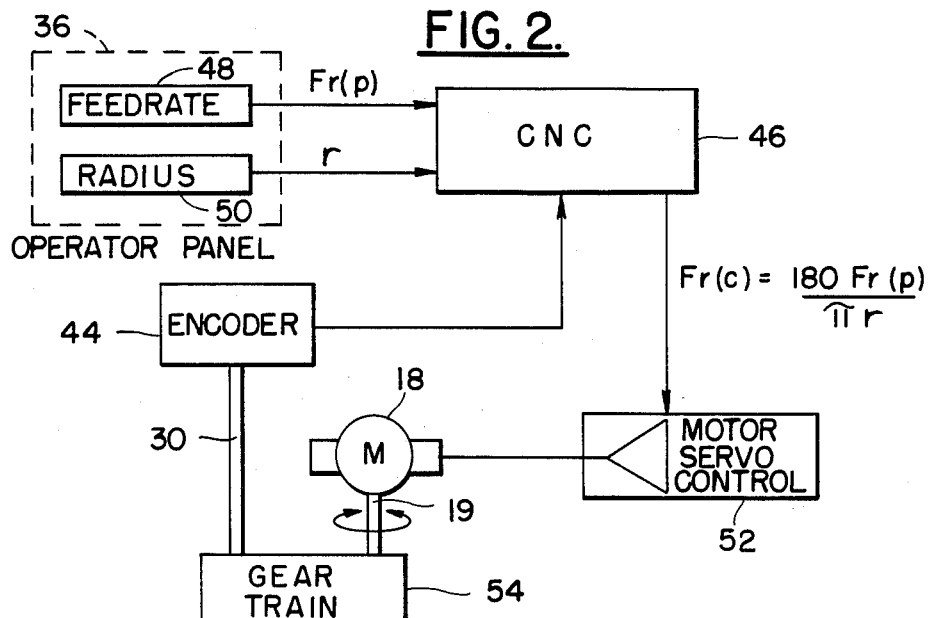
FIG. 2 is a block diagram of the electromechanical computing system for computing the rotational speed for the spindle and for rotating the spindle.
Figure 3:
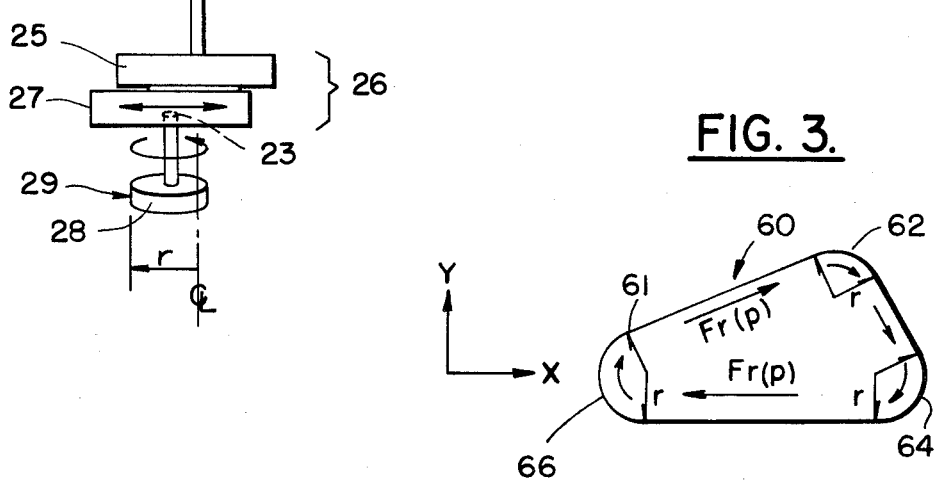
FIG. 3 is a sketch showing one example of a shape in which straight surfaces are ground with adjoining arc segments.
Figure 4:
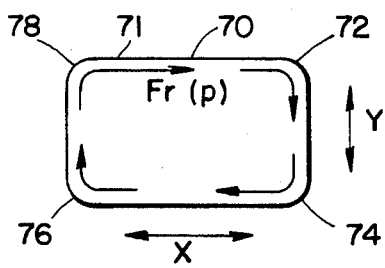
FIG. 4 is a sketch of another example of a shape including straight surfaces with adjoining arcs.

To grind the shape 60 shown in FIG. 3, a grinding wheel might be started at the point labeled 61. From this point, the work holding table 32 (shown in FIG. 1) to which the workpiece is mounted can be indexed in the X and Y directions so that the tool moves toward arc segment 62 along the straight path shown. The combined movement in the X and Y directions will occur at a preprogrammed feedrate Fr(p). In grinding arc segment 62, it will be desirable to maintain the feedrate "Fr(p)" as grinding takes place along the circumference of the arc. In order to accomplish this, a new feedrate for the rotation of spindle 30 about the C-axis must be computed. It has been found that this new feedrate, designated "Fr(c)", can be calculated as a function of the preset feedrate Fr(p) and the radius "r" defined by the distance from the center axis of spindle 30 to the edge 29 of the grinding wheel 28, as shown in FIG. 2. This relationship will be described in greater detail below.

Once the grinding wheel has traversed the circumference necessary in grinding arc segment 62 (FIG. 3), the operation will proceed from arc segment 62 toward arc segment 64 along the X and Y axes of work holding table 32 as shown. This is achieved by indexing work holding table 32 along its X and Y axes at the preset feedrate Fr(p). Movement of work holding table 32 as described will produce a straight, or linear surface between arc segments 62 and 64.

Once the workpiece has been advanced to the point where arc segment 64 is to be ground, spindle 30 will be rotated at the calculated feedrate Fr(c) so that the overall feedrate will be maintained constant. From arc segment 64, grinding continues solely along the X axis toward arc segment 66 at the preset feedrate Fr(p). After arc segment 66 is ground by rotating spindle 30 at the calculated feedrate Fr(c), the workpiece will be advanced back to starting point 61 along the X and Y axes. In this manner, the entire perimeter of shape 60 shown in FIG. 3 will be ground at a constant, preset feedrate Fr(p). The rotation of spindle 30 about the C-axis at the calculated feedrate Fr(c) to grind the arc segments ensures that an overall uniform surface speed will be maintained at the cutting edge 29.

Cutting of shape 70 shown in FIG. 4 proceeds in much the same manner, with arc segments 72, 74, 76, and 78 ground by rotating the C-axis of spindle 30 at the computed feedrate Fr(c). Commencing at point 71, linear movement along the X and/or Y axis occurs at the preset feedrate Fr(p).

Turning now to FIG. 2, the system for providing arc segment grinding while maintaining uniform surface speed at the cutting edge is shown diagrammatically. The heart of the system is a computer numerical controller ("CNC") 46. A machine operator inputs, via operator control panel 36, a preset feedrate Fr(p) using feedrate input means 48. The operator also inputs to CNC 46 the radius "r" from the center axis of spindle 30 to the cutting edge 29 of grinding wheel 28. The radius information is entered through radius input means 50. The operator computes the radius "r" by physically measuring the distance from the center axis of spindle 30 to cutting edge 29. As shown in FIG. 2, the operator can adjust the radius by offsetting the receptacle portion 27 of tool holder 26 from base portion 25 thereof. Base portion 25 of tool holder 26 is mounted to spindle 30.

Once the feedrate Fr(p) and radius "r" information is entered, CNC 46 computes, as a function of the entered values, a rotational speed Fr(c) for spindle 30 to provide the desired uniform surface speed at the cutting edge 29 of tool 28 as the tool alternates between linear grinding along the X or Y axis and arc grinding along the C-axis. The computation is made in accordance with the formula:

$$Fr(c) = \frac{180 \, Fr(p)}{\pi r}$$

Figure 5:
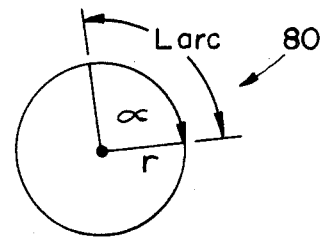
FIG. 5 is a sketch for use in deriving the relationship between the C-axis feedrate and the linear feedrate desired during a grinding or cutting operation.

The derivation of the above formula will be explained with reference to FIG. 5 of the drawings, which is a sketch of a circle 80 depicting an arc to be ground. For an arc segment of a given length $L_{arc}$, an angle $\alpha$ will be defined. Since the circumference of the circle can be expressed as $2\pi r$ and the entire circle encloses 360°, then $$L_{arc} = \frac{2\pi r \alpha}{360}.$$

Grinding the distance $L_{arc}$ at the preset feedrate Fr(p) will require an amount of time $$T_{arc} = \frac{L_{arc}}{Fr(p)}.$$

The rate at which spindle 30 must be rotated about the C-axis in order to cover the angle $\alpha$ in time $T_{arc}$ can be computed from the formula $$Fr(c) = \frac{\alpha}{T_{arc}}.$$

Substituting for $T_{arc}$, it is seen that $$Fr(c) = \frac{\alpha Fr(p)}{L_{arc}}.$$

Substituting for $L_{arc}$, it can be seen that $$Fr(c) = \frac{180 Fr(p)}{\pi r}.$$

The computed feedrate for the C-axis, Fr(c) is expressed in units of "degrees per unit time".

After computing the C-axis feedrate Fr(c), CNC 46 outputs a signal satisfying the computed feedrate to motor servo control 52, which is a conventional motor drive unit. Motor servo control 52 drives motor 18 which is coupled to gear train 54 through shaft 19. Gear train 54 couples the rotary motion of motor 18 to spindle 30. Spindle 30, in turn, drives cutting or grinding tool 28 and an encoder 44. The output of encoder 44 is coupled to CNC 46 to provide a closed loop servo system responsible for rotating spindle 30 about the C-axis. Spindle rotation occurs at the computed C-axis feedrate Fr(c) for the arc length $L_{arc}$ required to cut or grind a desired shape.

In cutting or grinding a workpiece which has straight surfaces and adjoining arc segments at a constant feedrate without interruption, CNC 46 can be programmed to stop the movement of work holding table 32 in the X and/or Y direction concurrently with the commencement of rotation of spindle 30 about the C-axis. Similarly, CNC 46 can be programmed to stop rotation of spindle 30 about the C-axis concurrently with the commencement of movement of work table 32 along the X and/or Y axes. When C-axis rotation occurs at the computed rate Fr(c), the desired uniform surface speed at the cutting edge 29 of tool 28 will be acheived regardless of whether a straight line or an arc is being ground.

Although a single embodiment of the present invention has been disclosed for purposes herein, it is to be understood that many variations and modifications could be made thereto. It is intended to cover all of those variations and modifications which fall within the scope of the present invention as defined by the appended claims.

What is claimed is:

1. A method for grinding straight surfaces and adjoining arcs at a constant feedrate without interruption comprising the steps of:
coupling a grinding wheel to a spindle of a jig grinder;
offsetting said grinding wheel from a center axis of said spindle to establish a radius "r" from the spindle axis to a cutting edge of said grinding wheel;
mounting a workpiece to be machined to a worktable;

moving said worktable at a preset feedrate "Fr(p)" along a straight path to effect grinding of a straight surface on said workpiece by said grinding wheel;

computing, as a function of the established radius "r" and said preset feedrate "Fr(p)", a rotational speed for rotating said spindle to provide a uniform surface speed at the cutting edge of said grinding wheel as said wheel traverses said workpiece from a straight surface to an arc being ground; and stopping the work table and similtaneously rotating said spindle at the computed rotational speed when grinding an arc.

2. The method of claim 1 wherein said rotational speed "Fr(c)" is computed in accordance with the formula:

$$Fr(c) = \frac{180 Fr(p)}{\pi r}.$$

3. The method of claim 1 comprising a further step of stopping the rotation of said spindle concurrently with the commencement of movement of said worktable.

4. The method of claim 3 comprising a further step of stopping the movement of said worktable concurrently with the commencement of rotation of said spindle.

5. A machine tool comprising:

a work holding table for linear movement along an X and/or Y axis at a preset feedrate "Fr(p)" for linear grinding;

a spindle rotatable about a C-axis for arc grinding;

a tool holder, having a receptacle for holding a grinding tool, mounted to said spindle;

means for offsetting said receptacle from the center axis of said spindle to establish a radius "r" from the spindle axis to a cutting edge of the tool mounted in said receptacle;

means for computing, as a function of the established radius "r" and said preset feedrate "Fr(p)", a rotational speed "Fr(c)" for said spindle to provide a uniform surface speed at the cutting edge of the tool as the tool alternates between linear grinding along said X and/or Y axis and arc grinding about said C-axis; and means for rotating said spindle about said C-axis to traverse an arc at said computed rotational speed "Fr(c)".

6. The machine tool of claim 5 wherein said computing means determines the rotational speed "Fr(c)" for said spindle in accordance with the formula:

$$Fr(c) = \frac{180 Fr(p)}{\pi r}.$$

* * * * *